Nov. 8, 1927.
L. E. LA BRIE
1,648,552
BRAKE
Filed May 9, 1927
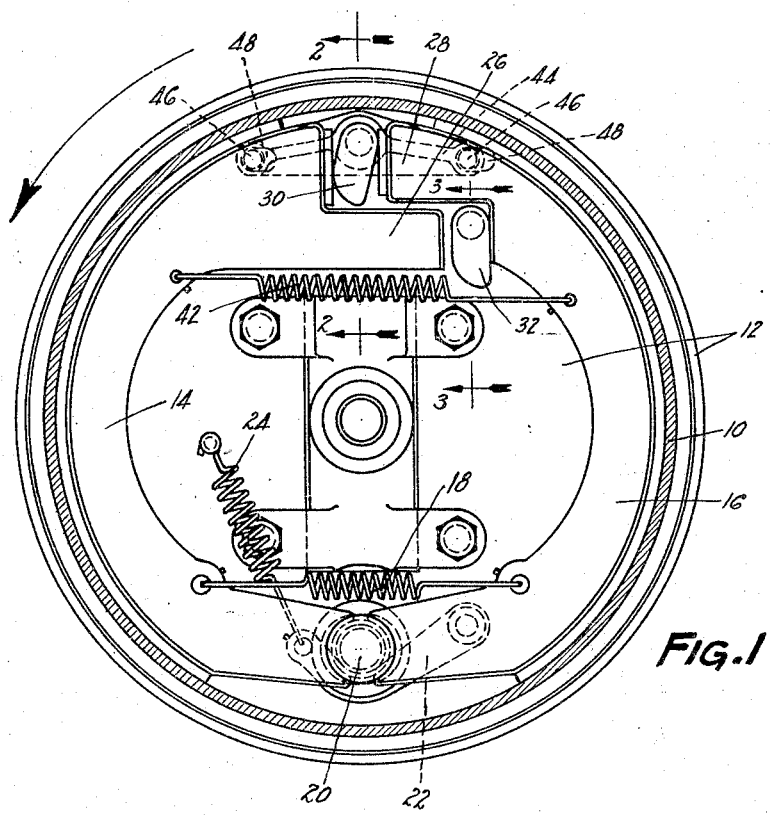
FIG.1
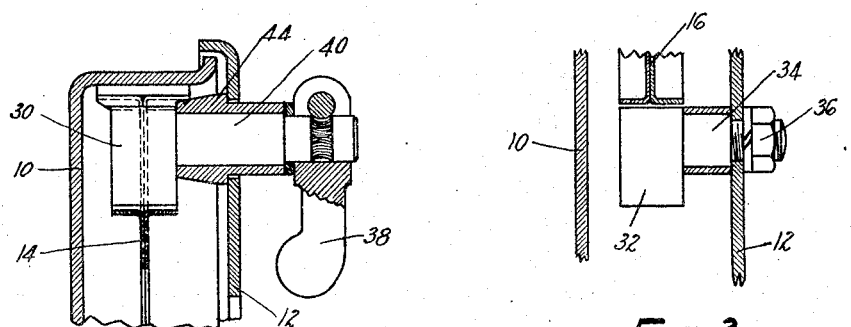
FIG.2
FIG.3
INVENTOR
LUDGER E. LA BRIE
BY
ATTORNEY Patented Nov. 8, 1927.

1,648,552

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed May 9, 1927. Serial No. 189,749.

This invention relates to brakes, and is illustrated as embodied in an internal expanding automobile brake. An object of the invention is to provide a very compact arrangement of the applying and torque-taking means of the brake, the arrangement illustrated being especially adapted for use with a friction device which shifts its anchorage when the direction of rotation of the drum is reversed.

In one desirable embodiment, the ends of the friction device (which is preferably made up of connected rigid shoes) are provided with overlapping tongues, or are otherwise so formed with respect to the applying device and the torque-taking device that each of the ends has a part projecting past one of the devices toward the other. This is especially advantageous in a brake for a front wheel, where the friction device must encircle the wheel knuckle, so that the space radially of the brake drum is extremely limited.

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, showing the shoes in side elevation;

Figure 2 is a partial section on the line 2—2 of Figure 1, showing the applying device; and Figure 3 is a partial section on the line 3—3 of Figure 1, showing the torque-taking device.

The brake selected for illustration includes a rotatable drum 10, at the open side of which is a backing plate 12, and within which is a friction device comprising shoes 14 and 16. Shoes 14 and 16 are pivotally connected by being held by a spring 18 against opposite sides of a pivot 20, which is embraced at one end by a double wedge surface on a centering lever 22 operated by a spring 24. Except as further described below, the brake may if desired be constructed substantially as described in my Patent No. 1,634,368, granted July 5, 1927.

According to an important feature of the present invention, the ends of the friction device (i. e. the ends of shoes 14 and 16) are provided respectively with tongues 26 and 28, arranged to overlap each other. An applying device, such as a single-lobed cam 30, is arranged between the end of tongue 28 and the body of shoe 14; while a torque-taking device, such as a similar cam 32, is arranged between the end of tongue 26 and the body of shoe 16. Thus a part of shoe 14 projects past the applying device 30 toward the torque-taking device 32, while a part of shoe 16 projects past the torque-taking device 32 toward the applying device 30.

The single-lobed cam 32 is shown as being integral with a stem or shaft 34 secured to the backing plate 12 by a nut or the like 36, the cam thus being adjustable to shift the free end of shoe 14 more or less (when the brake is released) to compensate for the wear of the brake.

The single-lobed cam 30, or its equivalent, may be operated by an arm 38 on a shaft 40, against the resistance of a return spring 42. Shaft 40 is journalled in a bracket or support 44, secured to the backing plate 12 by bolts or other fastenings 46 passing through slots 48 in the backing plate 12, so that the entire applying device is free to shift toward the right in Figure 1 when shoe 14 anchors against cam 32,—i. e. when the drum is turning clockwise, with the car moving backward.

It will be noted that the adjustment of the brake by turning cam 32 does not affect the released position of shoe 16, and does not therefore disturb the relation of that shoe to cam 30.

While one illustrated embodiment has been described in detail, it is not my intention to limit the scope of the invention to that particular embodiment, or otherwise than by the terms of the appended claims.

I claim:

1. A brake comprising, in combination, an applying device, a torque-taking device, and a friction device having at one end a part engageable with the applying device and another part extending past the applying device and engageable with the torque-taking device.

2. A brake comprising, in combination, a drum, an applying device, a torque-taking device, and a friction device shiftable to anchor differently in opposite directions of drum rotation and having a part engageable with the applying device and another part extending past the applying device and engageable with the torque-taking device.

3. A brake comprising, in combination, a drum, an applying device, a torque-taking device at one side of the applying device, and a friction device having its ends operable by the applying device and operatively engageable with the torque-taking device and having one end provided at its unconnected end with a part projecting past the torque-taking device toward the applying device and having the other end provided with a part projecting past the applying device toward the torque-taking device.

4. A brake comprising, in combination, a drum, an applying device, a torque-taking device at one side of the applying device, and a friction device including connected shoes and having its ends operable by the applying device and operatively engageable with the torque-taking device and having one shoe provided at its unconnected end with a part projecting past the torque-taking device toward the applying device and having the other shoe provided at its unconnected end with a part projecting past the applying device toward the torque-taking device.

5. A brake comprising, in combination, a drum, a friction device having a body portion engageable with the drum and having overlapping tongues at its free ends, an applying device between the end of one of the tongues and the body portion at the opposite end of the friction device, and a torque-taking device between the end of the other of the tongues and the body portion at the end of the body portion opposite said other tongue.

6. A brake comprising, in combination, a drum, a friction device having a body portion engageable with the drum and having overlapping tongues at its free ends, an operating cam between the end of one of the tongues and the body portion at the opposite end of the friction device, and a stationary cam between the end of the other of the tongues and the body portion at the end of the body portion opposite said other tongue.

7. A brake comprising, in combination, a drum, shoes having body portions engageable with the drum and having overlapping tongues at their adjacent ends, an applying device between the end of the tongue on the first shoe and the body portion of the second shoe, and a torque-taking device between the end of the tongue on the second shoe and the body portion of the first shoe.

8. A brake comprising, in combination, a drum, shoes having body portions engageable with the drum and having overlapping tongues at their adjacent ends, an applying cam between the end of the tongue on the first shoe and the body portion of the second shoe, and a torque-taking cam between the end of the tongue on the second shoe and the body portion of the first shoe.

9. A brake comprising, in combination, a drum, shoes having body portions engageable with the drum and having overlapping tongues at their adjacent ends, an applying device between the end of the tongue on the first shoe and the body portion of the second shoe, and a torque-taking device between the end of the tongue on the second shoe and the body portion of the first shoe, said devices comprising similar cams one of which which is operatively movable and the other of which is stationary but adjustable.

In testimony whereof, I have hereunto signed my name.

LUDGER E. LA BRIE.